(12) United States Patent
Vose (10) Patent No.: US 11,316,354 B1
(45) Date of Patent: Apr. 26, 2022

(54) WIRELESS CHARGER WITH INTEGRATED CABLE REEL

(71) Applicant: Voice Comm, LLC, Pennsauken, NJ (US)

(72) Inventor: Colin Vose, Baltimore, MD (US)

(73) Assignee: VOICE COMM, LLC, Pennsauken, NJ (US)

( * ) Notice: Subject to any disclaimer, the term of this patent is extended or adjusted under 35 U.S.C. 154(b) by 379 days.

(21) Appl. No.: 16/659,725

(22) Filed: Oct. 22, 2019

(51) Int. Cl.
| H02J 7/00 | (2006.01) |
| H02G 11/02 | (2006.01) |
| H02J 7/02 | (2016.01) |
| H02J 50/00 | (2016.01) |

(52) U.S. Cl.
CPC ............ *H02J 7/0042* (2013.01); *H02G 11/02* (2013.01); *H02J 7/025* (2013.01); *H02J 50/005* (2020.01)

(58) Field of Classification Search
CPC ........ H02J 7/0042; H02J 7/025; H02J 50/005; H02G 11/02
See application file for complete search history.

(56) References Cited

U.S. PATENT DOCUMENTS

| 6,483,033 B1 * | 11/2002 | Simoes | G02B 6/4457 174/135 |
| 6,600,109 B1 * | 7/2003 | Andre | B65H 75/36 174/135 |
| 7,165,739 B2 * | 1/2007 | Wei | H02G 11/02 242/378.1 |
| 8,876,560 B2 * | 11/2014 | Thompson | B65H 75/14 439/709 |
| 9,592,991 B1 * | 3/2017 | Keane | B65H 75/14 |
| 9,917,453 B1 * | 3/2018 | Banon | H02J 7/00 |
| 2005/0236243 A1 * | 10/2005 | Huang | H02G 11/02 191/12.4 |
| 2005/0284980 A1 * | 12/2005 | Chang | B65H 75/406 242/400.1 |
| 2008/0121763 A1 * | 5/2008 | Mori | H02G 3/32 248/68.1 |
| 2013/0256446 A1 * | 10/2013 | Kwankijpongsa | H02G 11/02 242/396.2 |
| 2014/0263796 A1 * | 9/2014 | Sparrowhawk | H02G 11/02 242/377 |
| 2014/0377983 A1 * | 12/2014 | Laube | H01B 7/06 439/501 |
| 2015/0069726 A1 * | 3/2015 | Prasad | B62B 5/069 280/33.992 |
| 2015/0325996 A1 * | 11/2015 | Ciampa | H02G 11/02 242/388.1 |
| 2016/0043514 A1 * | 2/2016 | George | H01R 13/665 439/501 |

(Continued)

*Primary Examiner* — Stacy Whitmore
(74) *Attorney, Agent, or Firm* — Katten Muchin Rosenman LLP (57) ABSTRACT

A wireless charger includes a housing with a circumferential outer edge; the outer edge including an annular groove with opposing first wall and second wall; and a cable having a first end operably secured inside the housing and an opposite second end having a connector for connecting to a power source. The cable is removably wound inside the groove; and a sleeve is slidably attached around the cable. The sleeve is disposed between the first end and the opposite second end. The sleeve is slidable along the length of the cable, and the sleeve being frictionally removably attached between the first wall and the second wall.

20 Claims, 8 Drawing Sheets

(56) References Cited

U.S. PATENT DOCUMENTS

| | | | |
|---|---|---|---|
| 2016/0224064 A1* | 8/2016 | Fleisig | G06F 1/266 |
| 2016/0233703 A1* | 8/2016 | Miller | A45C 13/001 |
| 2016/0276856 A1* | 9/2016 | Miller | H02J 7/0042 |
| 2017/0264118 A1* | 9/2017 | Miller | H02J 7/0049 |
| 2017/0321853 A1* | 11/2017 | Chien | F21V 14/003 |
| 2018/0083468 A1* | 3/2018 | Dennis | H02J 7/0044 |
| 2018/0138683 A1* | 5/2018 | Girdzis | H02J 7/00 |
| 2019/0140461 A1* | 5/2019 | Adam | H02J 7/0027 |
| 2019/0170274 A1* | 6/2019 | Aguilar Ruelas | F16L 3/233 |
| 2019/0267821 A1* | 8/2019 | Chien | H02J 7/0042 |
| 2019/0341711 A1* | 11/2019 | Justin | H04L 29/06068 |
| 2019/0373999 A1* | 12/2019 | Nauertz | B25H 3/00 |
| 2020/0017038 A1* | 1/2020 | Pay | H02G 3/0487 |
| 2020/0119500 A1* | 4/2020 | Elagha | H01R 13/72 |
| 2020/0203975 A1* | 6/2020 | Sobh | H01R 25/003 |
| 2021/0347274 A1* | 11/2021 | Kadoko | B25J 9/1697 |
| 2021/0347601 A1* | 11/2021 | Shin | B65H 75/364 |
| 2021/0376658 A1* | 12/2021 | Marino | A41D 27/208 |

* cited by examiner

WIRELESS CHARGER WITH INTEGRATED CABLE REEL

FIELD OF THE INVENTION

The present invention is generally directed to an inductive wireless charger for mobile devices.

SUMMARY OF THE INVENTION

The present invention provides a wireless charger, comprising a housing including a circumferential outer edge; the outer edge including an annular groove with opposing first wall and second wall; and a cable having a first end operably secured inside the housing and an opposite second end having a connector for connecting to a power source. The cable is removably wound inside the groove; and a sleeve is slidably attached around the cable. The sleeve is disposed between the first end and the opposite second end and the sleeve is slidable along the length of the cable, the sleeve being frictionally removably attached between the first wall and the second wall.

The present invention further provides a cable reel and cable combination, comprising a body including a circumferential outer edge; the outer edge including an annular groove with opposing first and second walls; and a cable having a first end and an opposite second end. The cable is wound inside the groove; and a sleeve is slidably attached around the cable. The sleeve is disposed between the first end and the opposite second end, and the sleeve is slidable along the length of the cable, the sleeve being frictionally removably attachable between the first and second walls.

DETAILED DESCRIPTION OF THE INVENTION

Figure 1:
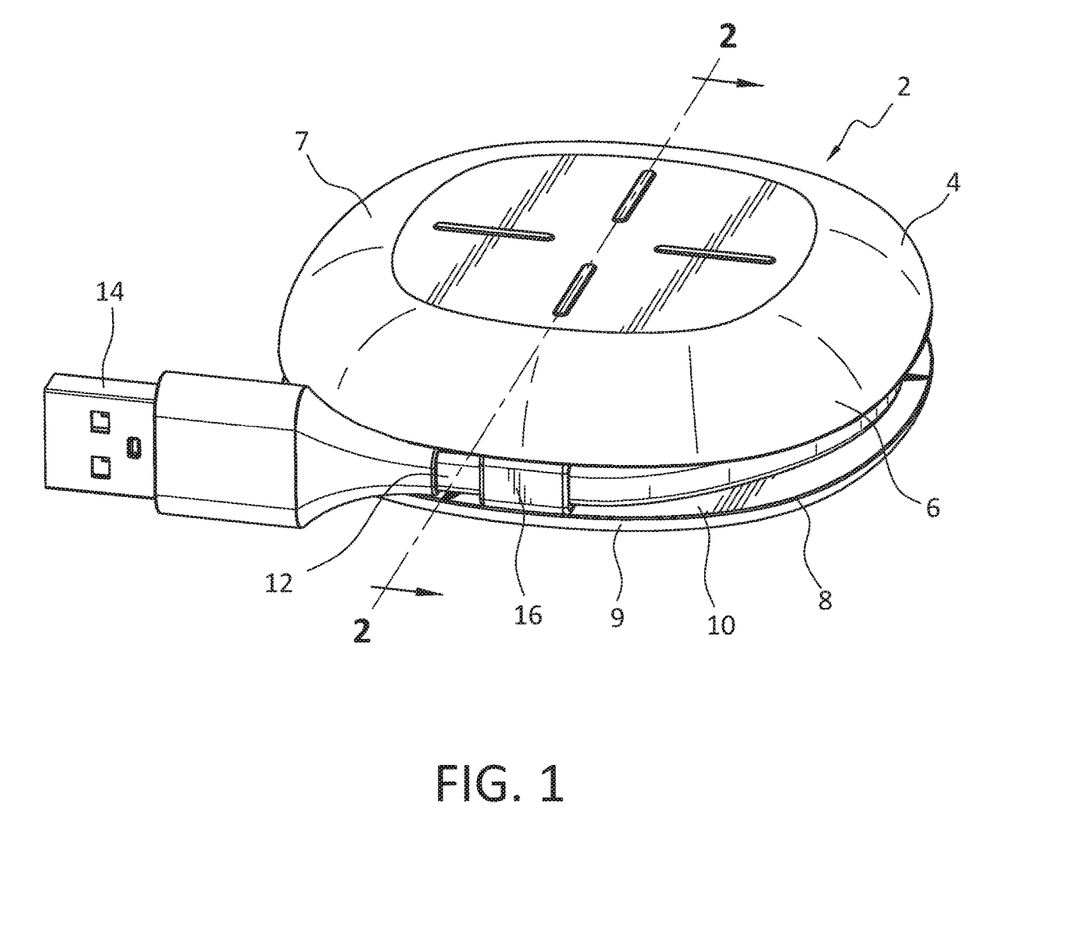
FIG. 1 is a top perspective view of a wireless charger with integrated cable reel embodying the present invention.

A wireless charger 2 embodying the present invention is disclosed in FIG. 1. The wireless charger 2 is used for wirelessly charging mobile devices, such as Qi compatible cell-phones, tablets, etc. without use of cables to connect the devices to the charger. Electro-magnetic induction between the wireless charger 2 and the mobile device provides the power transfer from the charger to the device. Qi is an open interface standard introduced by the Wireless Power Consortium in 2009 that defines wireless power transfer using inductive charging over distances of up to 4 cm (1.6 inches).

The charger 2 includes a housing 4 with an upper portion 6 and a lower portion 8. The upper portion 6 has rounded circumferential edge portion 7. Similarly, the lower portion 8 has rounded circumferential edge portion 9. An annular groove 10 is disposed between the upper housing 6 and the lower housing 8. A cable 12 is wound inside the groove 10. A free end of the cable is provided with a connector 14, such as a USB connector, for plugging into a 5V power. The cable 12 may be unwound to a desired length to reach for plugging the connector 14 to the power source, thereby reducing any unnecessary length of cable between the housing 4 and the power source. The cable 12 may be flattened with flat surfaces 11 and 13 to visually alert the user when the cable 12 is being twisted during winding, thereby promoting neatness in winding the cable inside the groove 10.

A sleeve 16 is slidable along the length of the cable 12. The sleeve 16 is advantageously frictionally fitted around the cable 16 so that the sleeve 16 may be fixed at any portion of the cable 12. The sleeve 16 is frictionally and detachably secured inside the groove 10 to keep the portion of the cable wound inside the groove 16 from unraveling. A length of cable 12 may be unwound from the housing 4, leaving the rest of the cable 12 inside the groove 10 secured in place by sliding the sleeve 16 to the portion of the cable just inside the housing and securing the sleeve 16 inside the groove 10. In this manner, only the required amount of the cable 12 to reach a power socket may be unwound from the housing 4, advantageously presenting a neat appearance. The sleeve 16 may be flattened with flat surfaces 17 and 19. The sleeve 16 may also be circular or any cross-sectional shape. The sleeve 16 is advantageously made of a resilient material with a dimension slightly larger in relation to the width or opening of the groove 10 to allow the sleeve 16 to be squeezed into the groove 10 and be held there by friction. The sleeve 16 may be made of a color different from the color of the cable 12 to conveniently locate the sleeve 16 for sliding along the cable length and securing inside the groove 10. For example, the color of the sleeve 16 may be of a color that contrasts with color of the cable. For example, the sleeve 16 may be white while the cable 12 may be grey.

Figure 2:
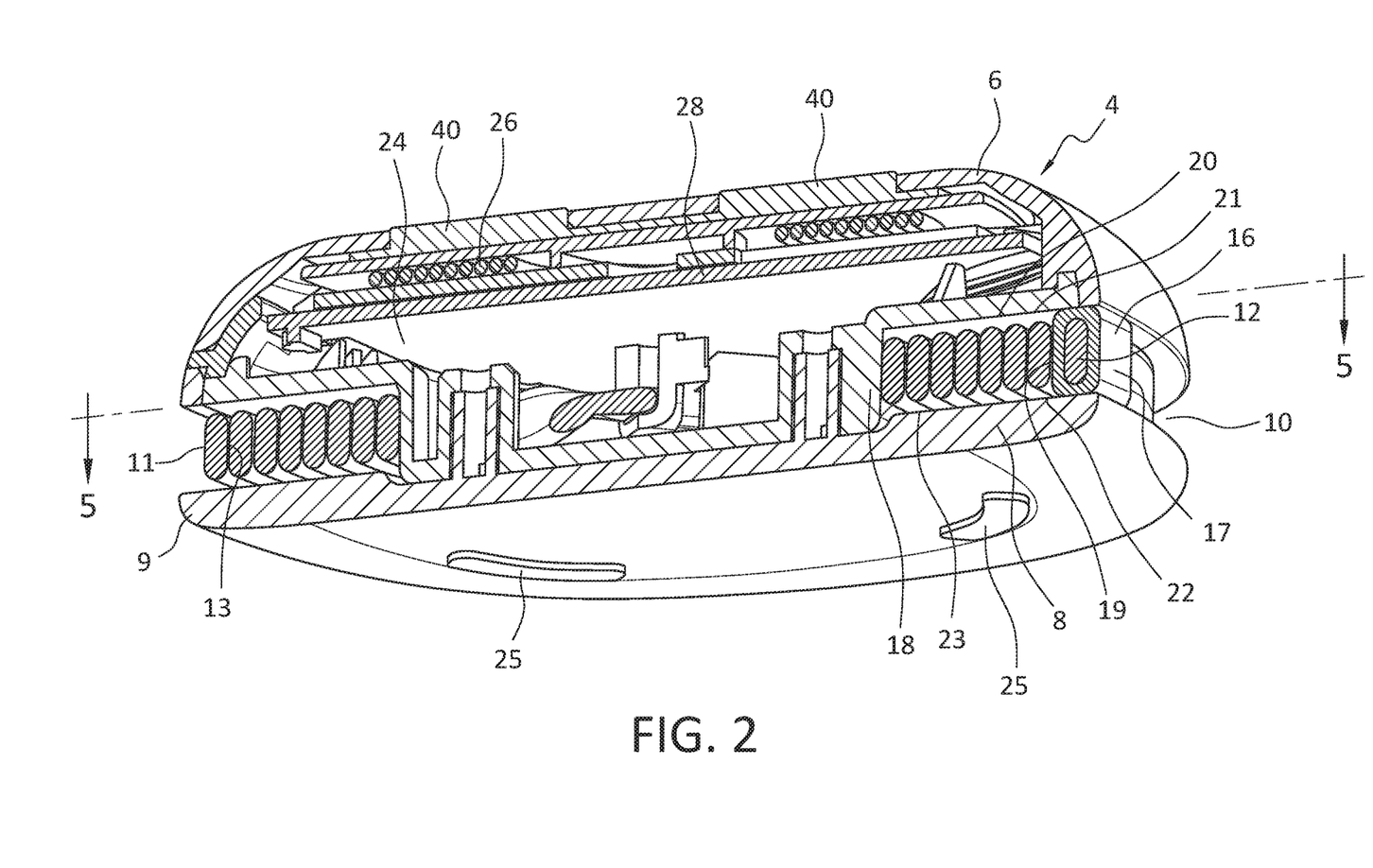
FIG. 2 is a cross-sectional view taken along line 2-2 in FIG. 1.

Referring to FIG. 2, the housing 4 includes a hub portion 18 around which the cable 12 is wound. The groove 10 includes opposed side walls surfaces 20 and 22 with respective wall surfaces 21 and 23 against which the sleeve 16 is frictionally and detachably attached. The side wall surfaces 21 and 23 are preferably parallel to each other. The upper housing portion 6 preferably includes a cavity 24 for housing a coil 26 for coupling with another coil (not shown) inside a Qi compatible mobile device. Qi compatible mobile devices are manufactured by Apple, Samsung, Google, LG and others. The upper housing portion 6 also includes a circuit board 28 for controlling the operation of the charger 2. The lower housing portion 8 includes nonslip pads 25.

Figure 3:
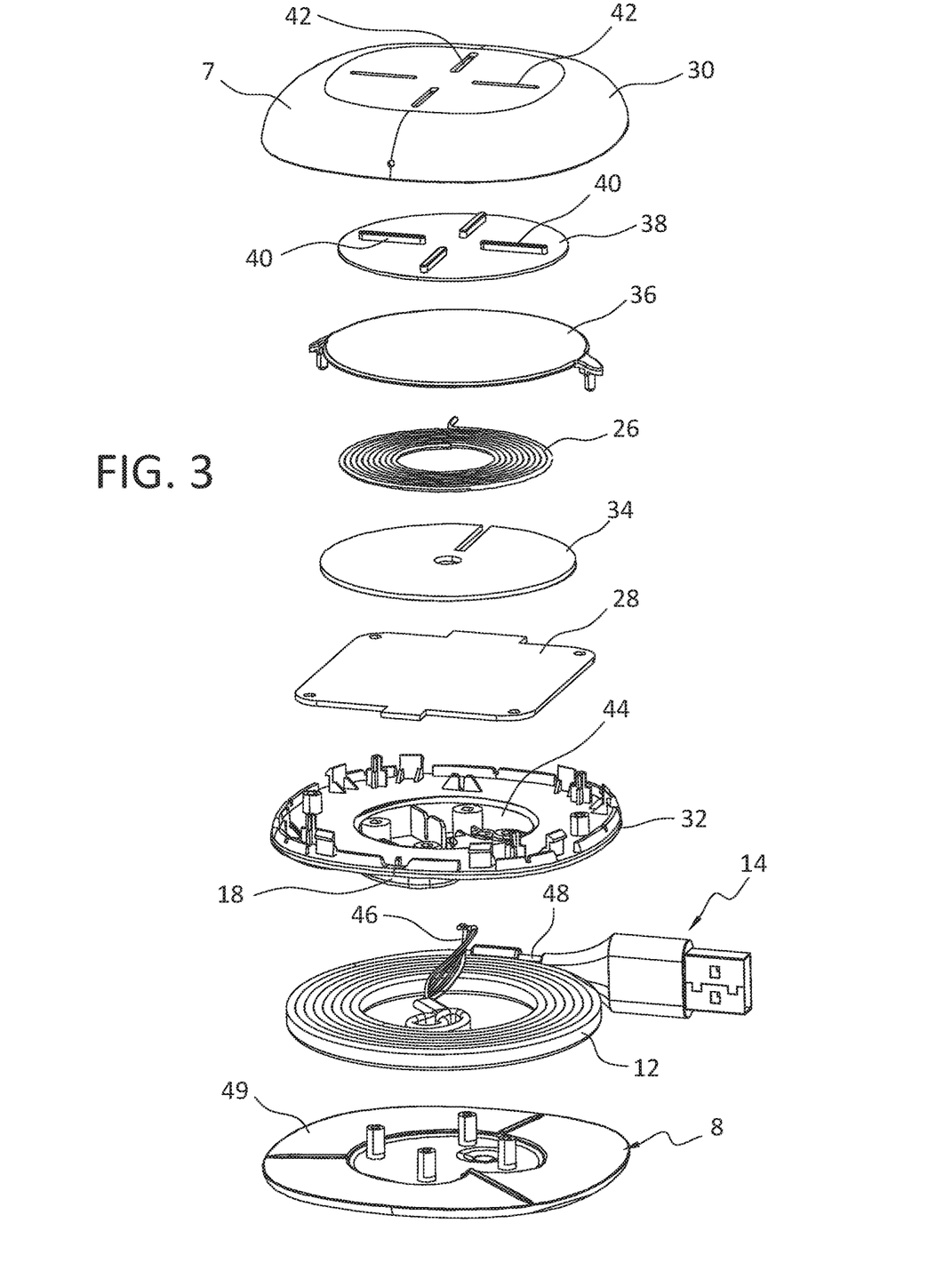
FIG. 3 is an assembly view of the wireless charger shown in FIG. 1.

Referring to FIG. 3, the upper portion 6 of the housing 4 preferably comprises an upper cover 30 and a lower cover 32 that when joined together provides the cavity 24 in which the electrical components of the charger 2 are disposed. The coil 26 is supported between a lower plate 34 and an upper plate 36. A plate 38 with projections 40 is supported on the upper plate 36. The projections 40 extend through openings 42 in the upper cover 30. The projections 40, preferably arranged in a cross-shaped configuration with adjacent projections 40 being perpendicular to each other. The projections 40 preferably define a center disposed above the center of the coil 26. The center of the projections 40 in the cross-shaped configuration advantageously provides a marker for centering the mobile device over the coil 26 when placed on top of the housing 4. The projections 40 are preferably made of nonslip material to also provide a slip resistant support to the mobile device when placed on top of the housing 4 for charging.

The lower cover 32 preferably includes the hub portion 18, which is hollow to provide a cavity 44 for accommodating structures for anchoring one end 46 of the cable 12 and for routing the end 46 to the circuit board 28. The connector 14 attaches to the other end 48 of the cable.

The lower portion 8 of the housing 4 is a plate 49 that attaches to the hub portion 18.

Figure 4:
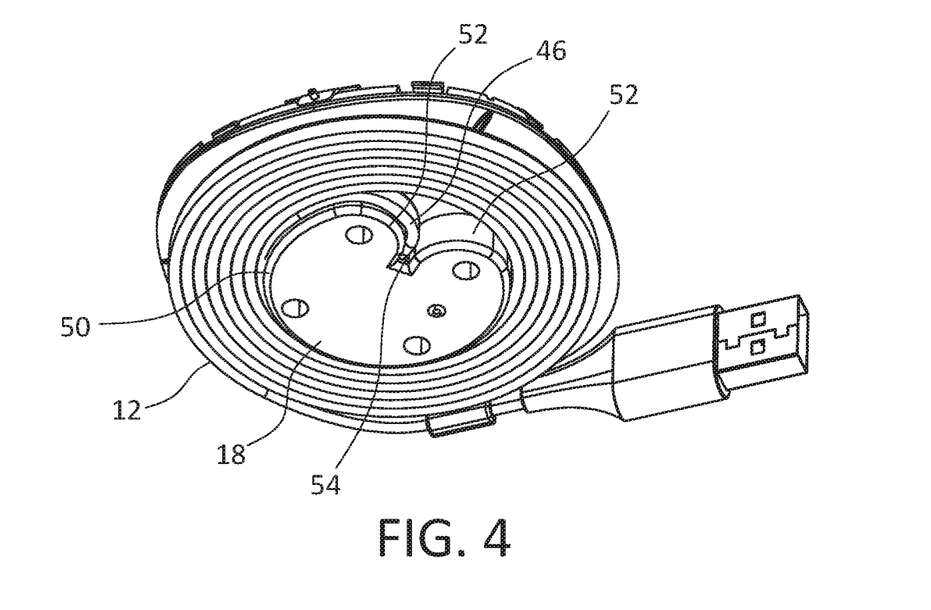
FIG. 4 is a bottom view of FIG. 1 with the lower portion of the housing removed.
Figure 5:
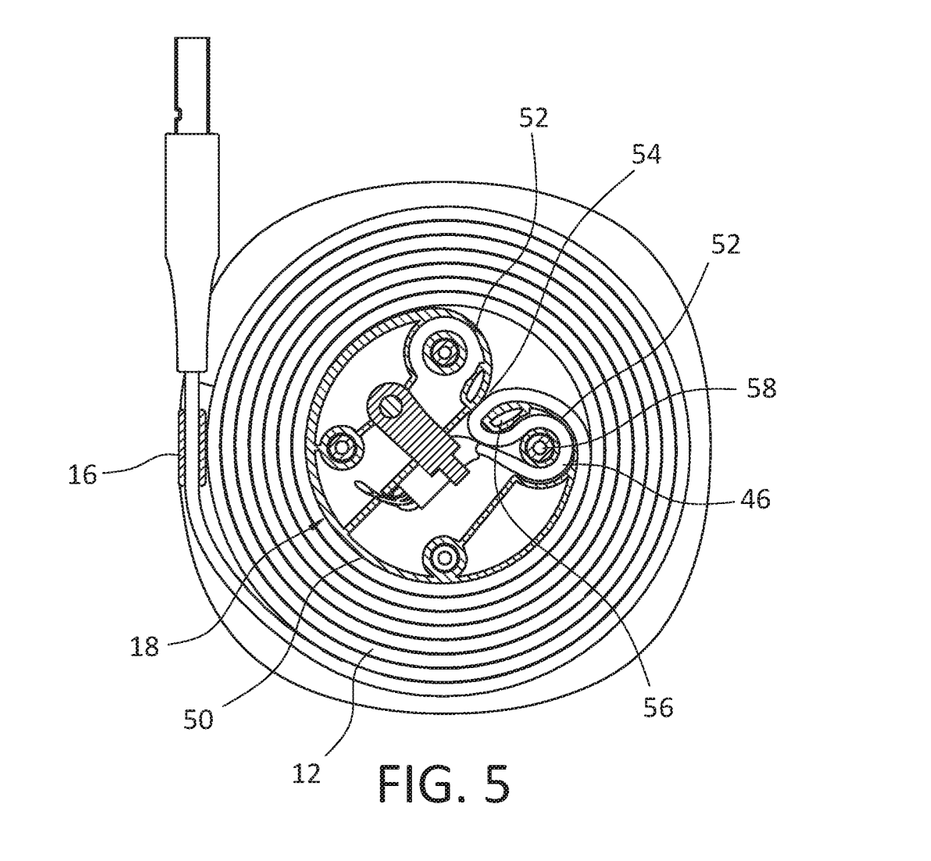
FIG. 5 is a cross-sectional view taken along line 5-5 in FIG. 2, showing the end of the cable inside the housing.

Referring to FIGS. 4 and 5, the cable 12 is shown wound around the hub portion 18. The plate 49 of the lower portion 8 has been removed to show the hub portion 18 and the wound cable 12. The hub portion 18 has a cylindrical side wall surface 50 interrupted by arcuate V-shaped side wall portions surfaces 52 with an entrance opening 54 at the bottom of the V-shape for entry of the cable 12 into the interior of the hub portion 18. The end portion 46 of the cable 12 is threaded in an S-shaped configuration around posts 56 and 58, advantageously anchoring the end portion 46 to the hub portion 18. The twin arcuate V-shaped wall portions surfaces 52 advantageously provide a smooth bending radii when winding the cable 12 around the hub portion 18 either in the clockwise or counter-clockwise direction.

An exemplary circuit for the charger 2 is disclosed in several sections in FIGS. 6A-6D, using standard circuit components well-known to a person skilled in the art.

Figure 6A:
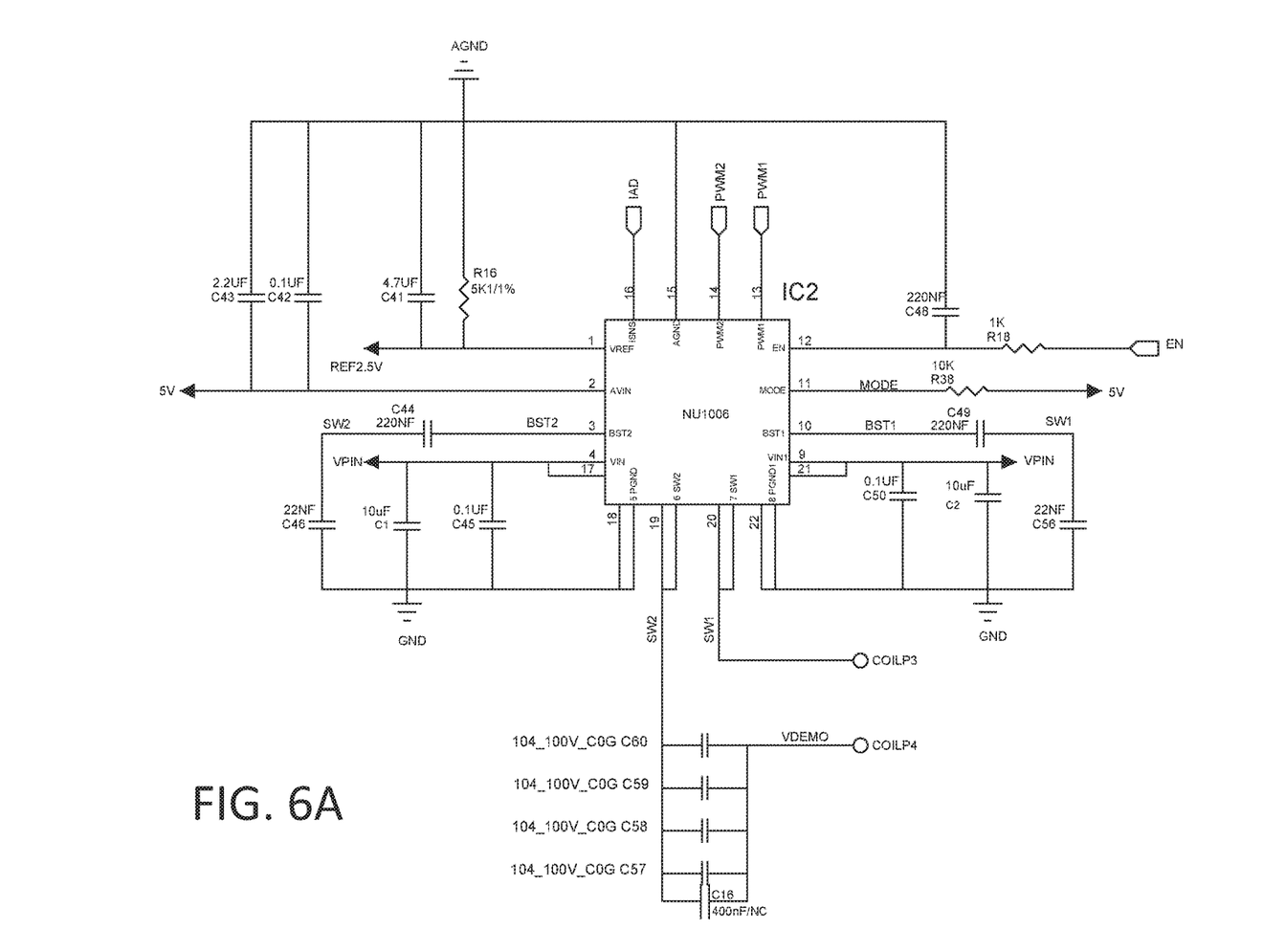
FIGS. 6A-6D are schematic circuit diagrams of an exemplary circuit used in the present invention.

FIG. 6A shows the power stage/coil section of the circuit that outputs a wireless signal via capacitive oscillation. The full-bridge drive IC2 NU1006 outputs a wave signal through SW1 and SW2.

Figure 6B:
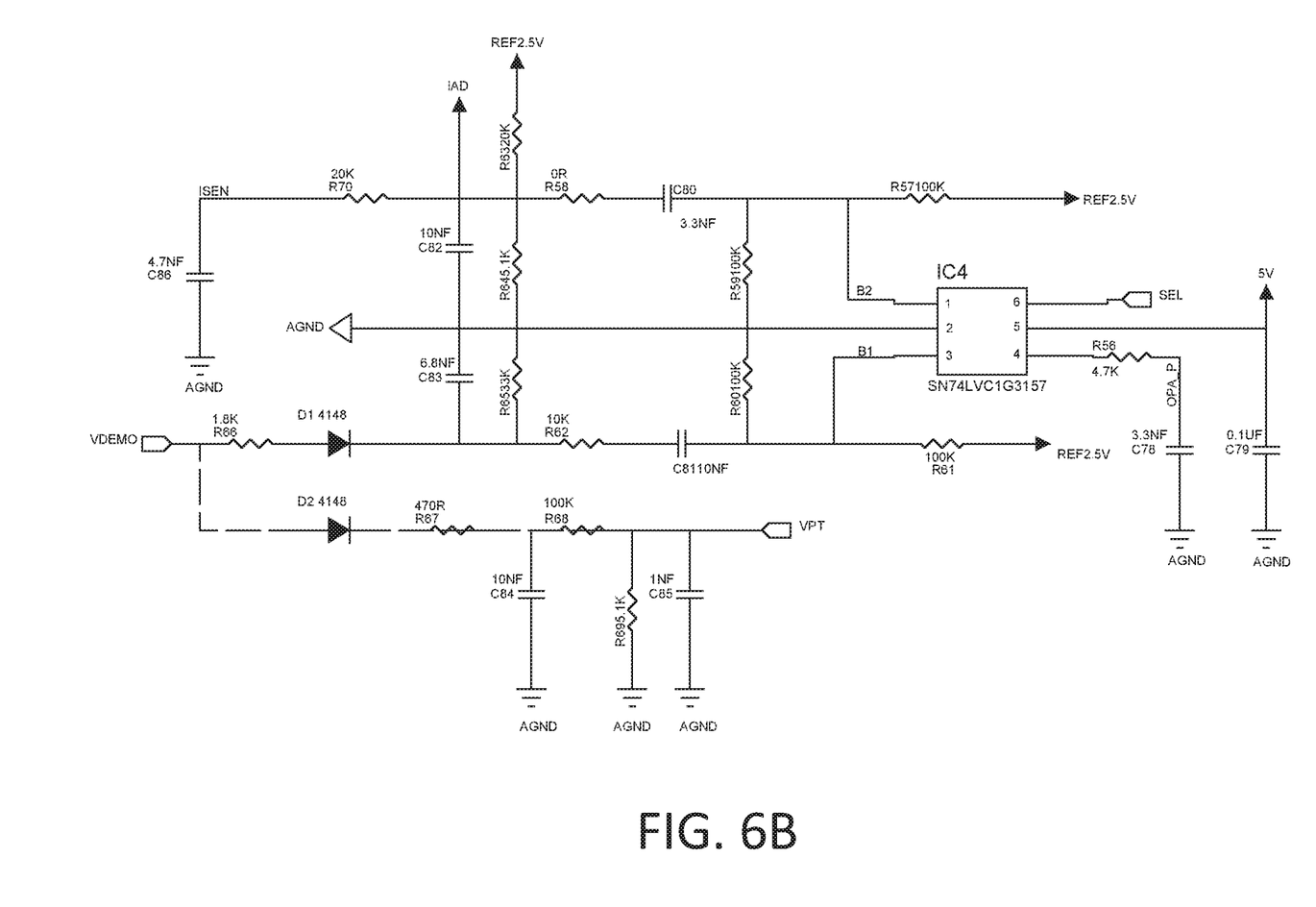

FIG. 6B shows the demodulation section of the circuit controlled through the IC4 SN74LVC1G3157. It primarily uses switching to obtain real-time voltage, current demodulation signal, and coil coupling condition to dictate the final output.

Figure 6C:
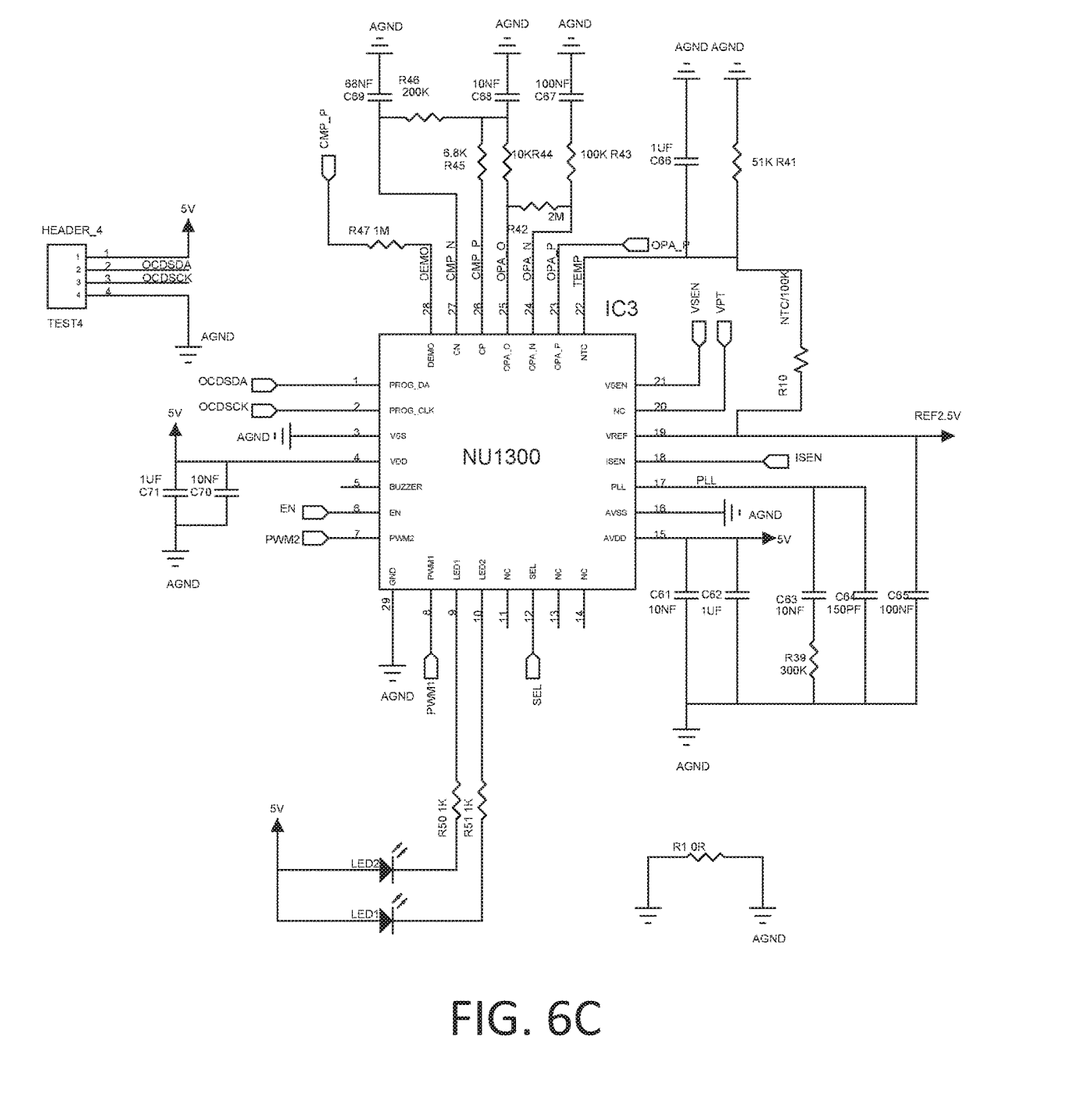

FIG. 6C shows the MCU section of the circuit. This controls the whole system and is dictated by the IC3 MCU NU1300. It primarily controls the current, voltage demodulation and the power IC output.

Figure 6D:
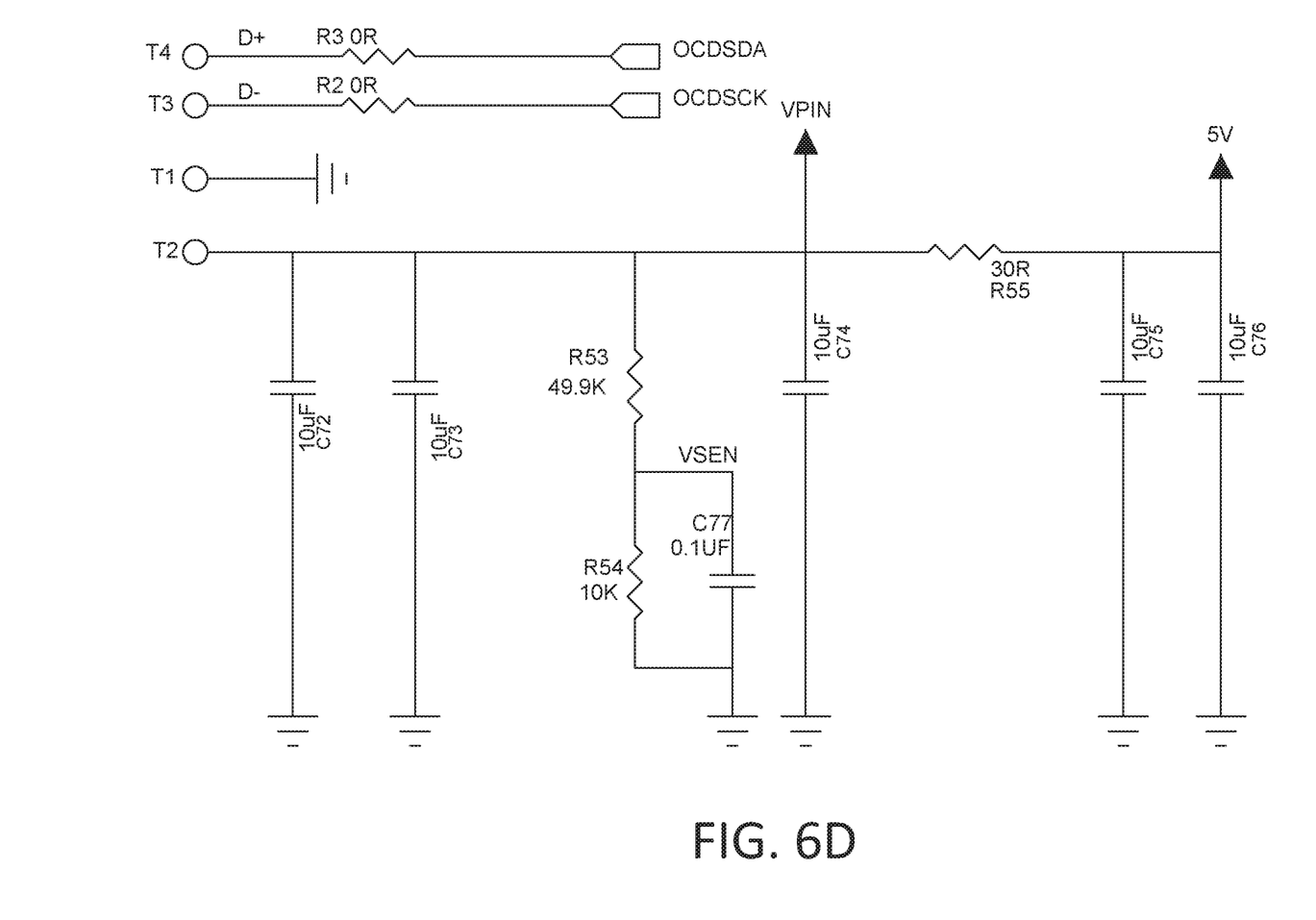

FIG. 6D is the Vin sense section of the circuit. It detects the input voltage and value and notifies the system if input voltage is too low and dictates the output power according to the input voltage.

In use, the sleeve 16 is detached from the groove 10 and a length of the cable 12 is unwound from the housing 4 to allow the connecter 14 to reach a power source. The sleeve 16 is then slid along the cable 12 toward the housing 4 to a point between the cable that is still wound inside the groove 10 and the cable that has just been unwound. The sleeve 16 is then inserted and attached inside the groove 10 to keep the cable within the groove from unwinding. Any unneeded length of the cable 12 is thus stored neatly inside the groove 10. A mobile device made to connect inductively with the coil 26, such as a Qi compatible cell-phone or tablet, is placed on top of the housing 4 over the coil 26 for charging. U.S. Pat. No. 10,277,060, hereby incorporated herein by reference, is an example of a wireless charger and its interaction with a mobile device being charged.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A wireless charger, comprising:
   a) a housing including a circumferential outer edge;
   b) the outer edge including an annular groove with opposing first wall and second wall;
   c) a cable having a first end operably secured inside the housing and an opposite second end having a connector for connecting to a power source, the cable is removably wound inside the groove; and
   d) a sleeve slidably attached around the cable, the sleeve is disposed between the first end and the opposite second end, the sleeve is slidable along the length of the cable, the sleeve being frictionally removably attached between the first wall and the second wall.

2. The wireless charger as in claim 1, wherein:
   a) the housing includes a first portion and a second portion space apart from each other; and
   b) a hub portion is disposed between the first portion and the second portion.

3. The wireless charger as in claim 2, wherein:
   a) the hub portion includes an opening through which the first end of the cable enters the housing.

4. The wireless charger as in claim 2, wherein:
   a) the hub portion includes first and second posts; and
   b) the first end of the cable is looped around the first and second posts in an S-shaped configuration.

5. The wireless charger as in claim 3, wherein:
   a) the hub portion includes an exterior side wall;
   b) a first portion of the side wall is circular and a second portion is V-shaped in cross-section; and
   c) the opening in the hub portion is at a bottom of the V-shaped second portion.

6. The wireless charger as in claim 1, wherein:
   a) the cable includes first and second flat surfaces; and
   b) the sleeve includes third and fourth flat surfaces.

7. The wireless charger as in claim 2, wherein a coil is disposed in the first portion.

8. The wireless charger as in claim 7, wherein the coil is disposed between a first plate and a second plate.

9. The wireless charger as in claim 7, wherein a circuit board is disposed in the first portion of the housing.

10. The wireless charger as in claim 2, wherein the first portion and the second portion include rounded edge portions.

11. The wireless charger as in claim 7, wherein:
    a) the first portion includes a top;
    b) a marker is operably associated with the top, the marker includes a center; and
    c) the center is disposed above a center of the coil.

12. The wireless charger as in claim 11, wherein the marker is cross-shaped.

13. The wireless charger as in claim 2, wherein:
    a) the first portion includes a top; and
    b) projections are operably associated with the top.

14. The wireless charger as in claim 13, wherein the projections are arranged to form a cross shape.

15. The wireless charger as in claim 1, wherein:
    a) the sleeve includes a first color;
    b) the cable includes a second color; and
    c) the first color is different from the second color.

16. A cable reel and cable combination, comprising:
    a) a body including a circumferential outer edge;
    b) the outer edge including an annular groove with opposing first and second walls;
    c) a cable having a first end and an opposite second end, the cable is wound inside the groove; and
    d) a sleeve slidably attached around the cable, the sleeve is disposed between the first end and the opposite second end, the sleeve is slidable along the length of the cable, the sleeve being frictionally removably attachable between the first and second walls.

17. The cable reel and cable combination as in claim 16, wherein the cable includes first and second flat surfaces.

18. The cable reel and cable combination as in claim 16 wherein the sleeve includes third and fourth flat surfaces.

19. The cable reel and cable combination as in claim 16, wherein the outer edge is rounded.

20. The cable reel and cable combination as in claim 16, wherein:
   a) the sleeve includes a first color;
   b) the cable includes a second color; and
   c) the first color is different from the second color.

\* \* \* \* \*